(No Model.)
T. McSWEENEY.
PIPE JOINT.
No. 393,381.  Patented Nov. 27, 1888.
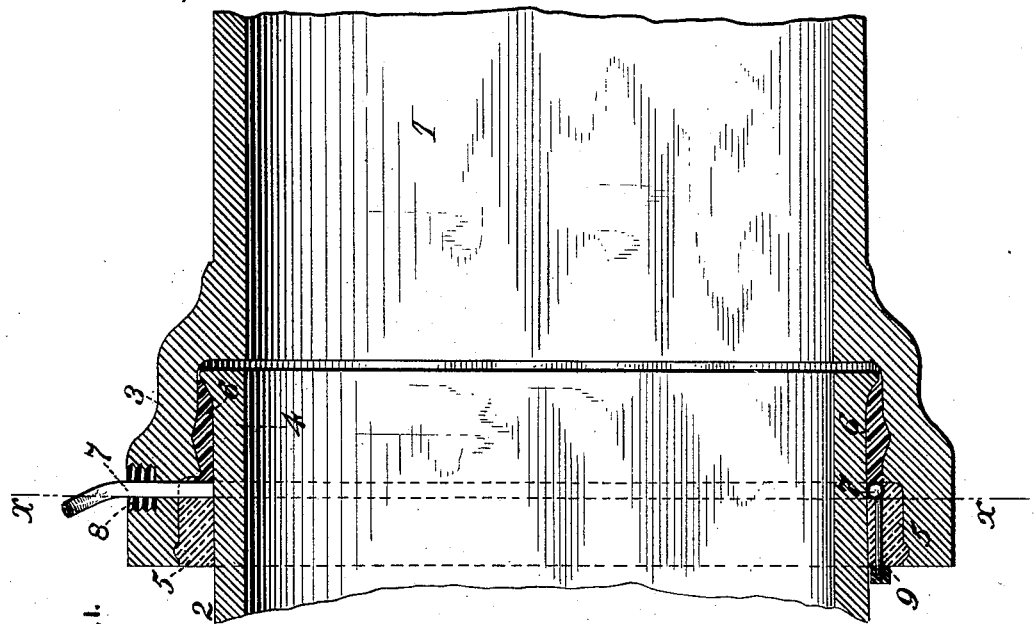
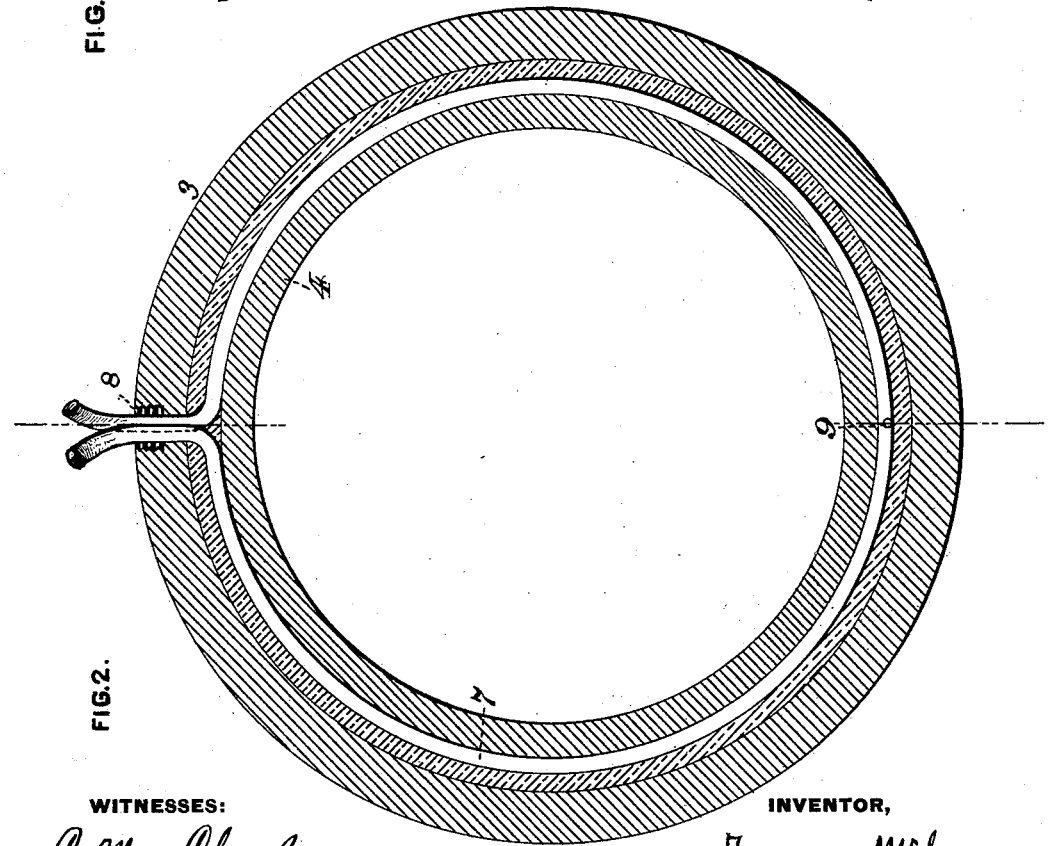
WITNESSES:
C. M. Clarke
F. E. Gaither
INVENTOR,
Terrence McSweeney
by Darwin C. Wolcott
Att'y.

UNITED STATES PATENT OFFICE.

TERRENCE McSWEENEY, OF ALLEGHENY, PENNSYLVANIA.

PIPE-JOINT.

SPECIFICATION forming part of Letters Patent No. 393,381, dated November 27, 1888.

Application filed January 19, 1888. Serial No. 261,296. (No model.)

*To all whom it may concern:*

Be it known that I, TERRENCE McSWEENEY, a citizen of the United States, residing at Allegheny, in the county of Allegheny and State of Pennsylvania, have invented or discovered a certain new and useful Improvement in Making Pipe-Joints, of which improvement the following is a specification.

The invention herein relates to certain improvements in making joints between sections of pipe forming a line of pipe for conducting fluids under pressure; and the invention has for its object the formation of a chamber within the joint for the reception of any leakage through the joint, and also the more perfect sealing or enameling the exposed surface of the packing between the pipe-sections. In general terms the invention consists in the method of forming chambered joints, all as more fully hereinafter described and claimed.

In the accompanying drawings, forming a part of this specification, Figure 1 is a longitudinal section through a joint between two adjacent sections of pipe; and Fig. 2 is a transverse section on the line *x x*, Fig. 1.

The pipe-sections 1 and 2 are formed with the bowl and spigot ends 3 and 4 of the usual construction, except that the bowl is recessed at its outer end, as shown at 5. The spigot end 4 is arranged within the bowl 3, and the space between it and the bowl at the inner end of the joint is packed with lead, 6, or other suitable material, in the usual manner. The inner wall of the bowl is grooved or contracted, as shown, in order to prevent any displacement of the lead packing. After the lead packing 6 has been carefully calked, a section of hose or other flexible tubing, 7, is passed around the spigot end 4, said hose being closely pressed against the lead packing, which extends to the inner end of the recess 5. The ends of the hose or tubing are passed through a hole, 8, formed in the bowl, as shown, and are connected with some suitable air-pump or other fluid-pressure-generating device for the purpose of inflating the hose, thereby rendering it sufficiently rigid or firm for subsequent operations. After the hose has been inflated, the recess 5 is filled with an asphaltum compound, such as is described in Letters Patent No. 356,411, granted January 18, 1887, or any other suitable material, the surface of the hose having been previously coated with a mixture of glycerine and soapstone or other substance, which will prevent the asphaltum from adhering to the hose. This asphaltum compound will flow into the space between the bowl and spigot, completely filling the remaining space between the bowl and spigot, the hose serving as a dam to prevent the asphaltum from flowing against the lead packing. As soon as the compound has hardened, the hose is withdrawn, thereby leaving a space between the lead packing and the compound for the reception of any gas or other fluid which may escape past the lead packing. Any fluid which may escape into the chamber thus formed is conducted away to a point of safety by a pipe secured in the hole 8, which is in communication. The integrity of the joint may be tested by connecting the hole 8 with any fluid-pressure apparatus and forcing air or other fluid into the chamber under any desired pressure. In order to stop any leakage which may be discovered, as above stated, a small pipe, 9, is arranged parallel with the pipe-sections, at or near the lowermost point of the joint, prior to pouring in of the asphaltum mixture, with its inner end bearing against the hose, as shown. This pipe 9 affords an escape from the chamber to the open air at or near the lowest point of the joint, but its outer end is kept normally closed by a cap or plug. In case a leak is discovered during the test hereinbefore described, I fill the chamber formed by the withdrawal of the hose with some suitable substance, as coal-tar or plaster of paris in a fluid condition, and after allowing the coal-tar or plaster-of-paris to remain therein a sufficient time to harden against the walls of the chamber, thereby coating or enameling the same, the cap or plug is removed from the pipe 9, and by applying air-pressure at the hole 8, blow out the remaining fluid material and replace the cap or plug on the pipe 9. This method of coating or enameling the inner walls of the joint chamber will effectually close any opening from the chamber to the open air.

In lieu of an inflated hose or tube section I may employ a rope or any other like device for forming the chamber in the joint. Care should be taken in all cases that the hose or other device employed should be coated with some substance that will prevent the asphaltum or other mixture from adhering thereto.

The principal characteristic of the invention herein is the provision of a temporary dam which shall prevent the fluid cement from flowing against the lead packing and filling the entire space between the bowl and spigot.

I claim herein as my invention—

The method herein described of forming chambered joints in pipe-lines for conducting fluids under pressure, which consists in inserting the spigot of one section into the bowl of the next, filling the space between the bowl and spigot at the inner end of the joint with a suitable packing, placing a removable dam between the bowl and spigot adjacent to the packing, filling the remaining space with a suitable cement, and then removing the dam, substantially as set forth.

In testimony whereof I have hereunto set my hand.

TERRENCE McSWEENEY.

Witnesses:
DARWIN S. WOLCOTT,
W. B. CORWIN.